US007692634B2

(12) United States Patent
Kimura et al.

(10) Patent No.: US 7,692,634 B2
(45) Date of Patent: Apr. 6, 2010

(54) PORTABLE ELECTRONIC APPARATUS

(75) Inventors: Kenichi Kimura, Kawasaki (JP); Masamichi Udagawa, New York, NY (US); Sigi Moeslinger, New York city, NY (US); Yoshifusa Togawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1171 days.

(21) Appl. No.: 11/255,919

(22) Filed: Oct. 24, 2005

(65) Prior Publication Data

US 2007/0091071 A1 Apr. 26, 2007

(51) Int. Cl.
*G09G 5/00* (2006.01)
(52) U.S. Cl. .................. 345/168; 345/156; 361/679.02; 361/679.49; 361/692
(58) Field of Classification Search ................. 345/168, 345/156; 361/683, 679.02, 679.49, 692; 710/15
See application file for complete search history.

(56) References Cited

U.S. PATENT DOCUMENTS

| 6,116,767 | A  | * | 9/2000 | Chaiken et al. ............... 710/15 |
| 6,798,649 | B1 | * | 9/2004 | Olodort et al. .............. 361/683 |
| 2002/0041483 | A1 | * | 4/2002 | Horii et al. ................. 361/683 |
| 2002/0063690 | A1 | * | 5/2002 | Chung et al. ................ 345/168 |
| 2003/0112590 | A1 | * | 6/2003 | Shimano et al. ............. 361/683 |
| 2004/0052044 | A1 | * | 3/2004 | Mochizuki et al. .......... 361/683 |
| 2004/0229663 | A1 | * | 11/2004 | Tosey et al. ............... 455/575.1 |
| 2005/0053365 | A1 | * | 3/2005 | Adams et al. ............... 386/125 |
| 2005/0066207 | A1 | * | 3/2005 | Fleck et al. ................. 713/320 |
| 2006/0038775 | A1 | * | 2/2006 | Agata et al. ................. 345/156 |
| 2006/0085145 | A1 | * | 4/2006 | Matsuoka et al. ............. 702/57 |

FOREIGN PATENT DOCUMENTS

| JP | 04-281509 |   | 10/1992 |
| JP | 05014987 A | * | 1/1993 |
| JP | 2001-318754 |   | 11/2001 |
| JP | 2004-363683 |   | 12/2004 |

* cited by examiner

*Primary Examiner*—Amare Mengistu
*Assistant Examiner*—Koosha Sharifi

(57) ABSTRACT

In a portable electronic apparatus, a second keyboard to be manipulated with a right hand is joined to a first keyboard unit including a first keyboard to be manipulated with a left hand so that the second keyboard can be turned down. A display unit having a built-in liquid crystal display is joined to the first keyboard unit so that the display unit can be tuned down. When the display unit is turned down, the display unit engages with the second keyboard unit that is turned down. When all the parts of the electronic apparatus are closed, the electronic apparatus serves as a CD player of a CD jacket size. When the display unit is opened, the electronic apparatus has not only the capability of a DVD player but also the capability of a simple personal computer. When all the parts are left open, the electronic apparatus serves as a personal computer having a full keyboard.

14 Claims, 18 Drawing Sheets

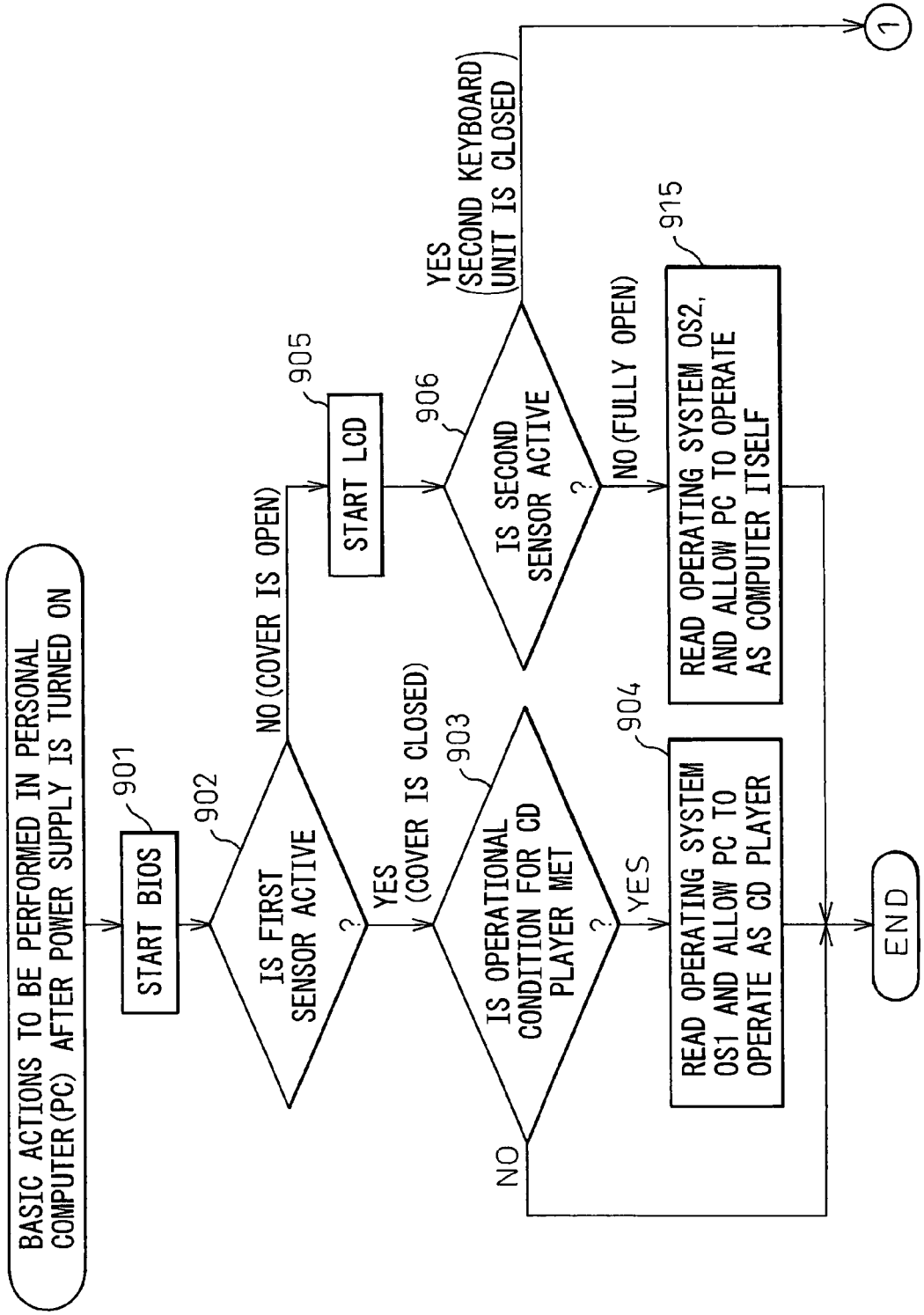

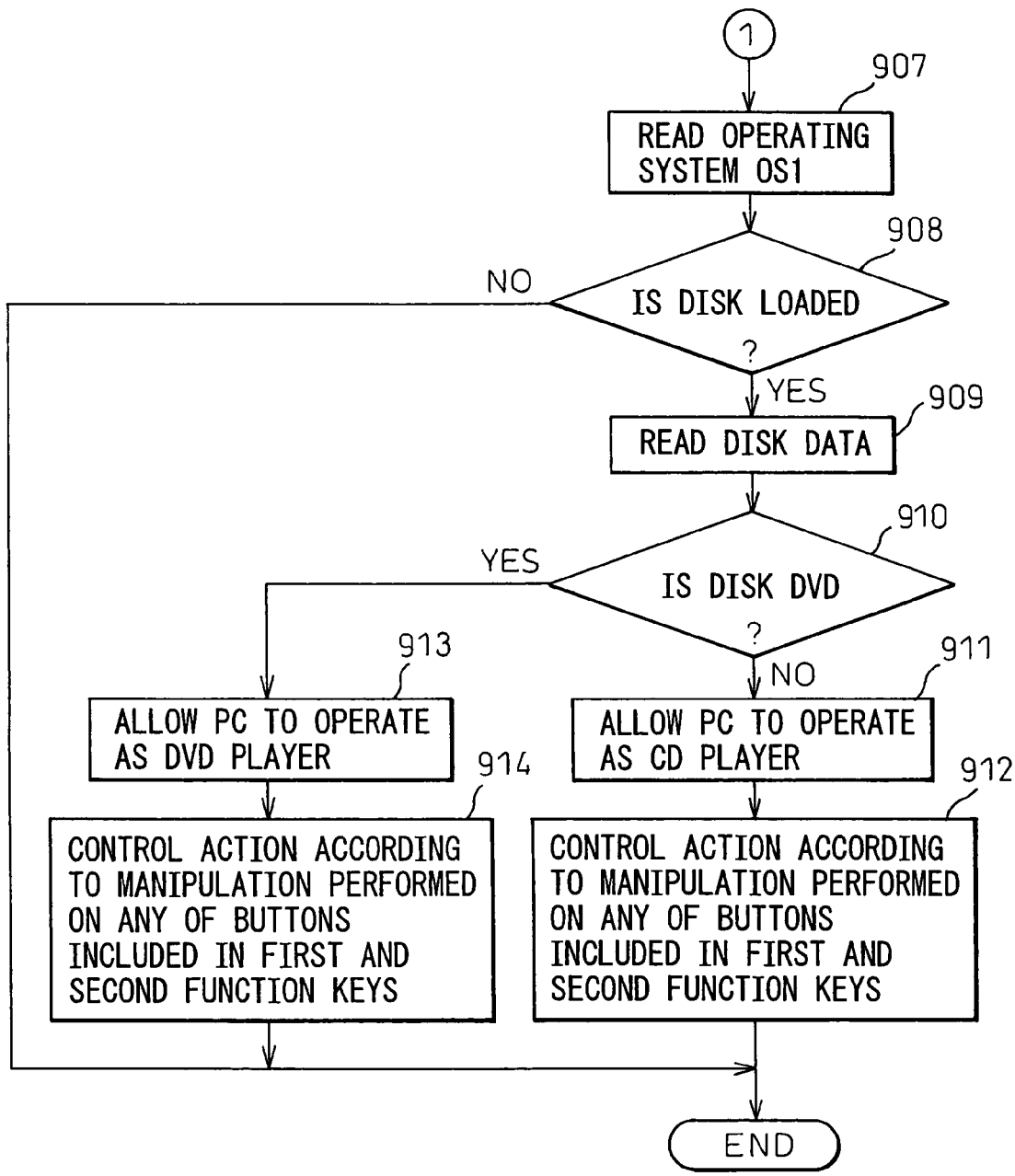

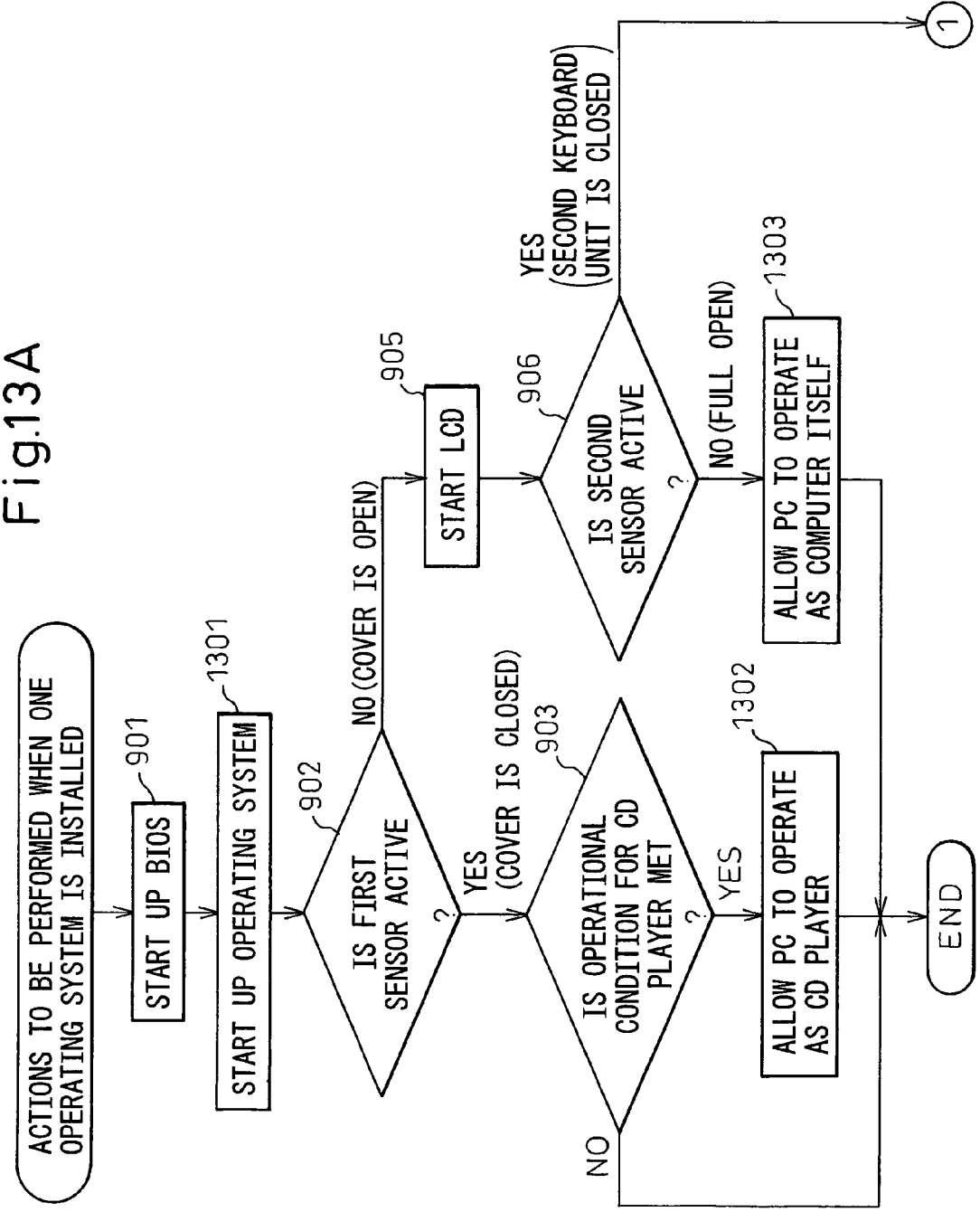

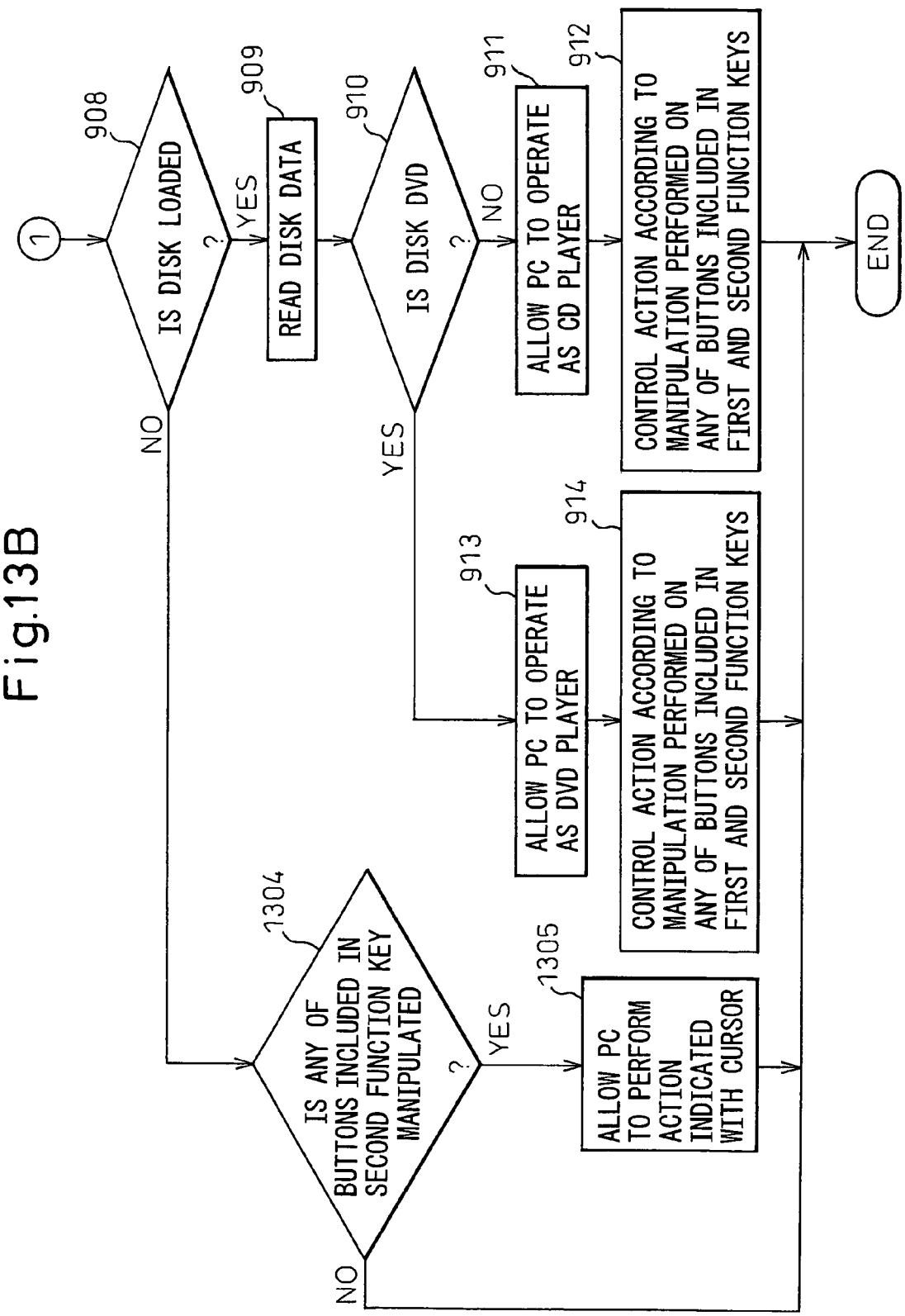

PORTABLE ELECTRONIC APPARATUS

BACKGROUND OF THE INVENTION

1. Field of the Invention

The present invention relates to a portable electronic apparatus or, more particularly, to a portable electronic apparatus having a cover. The apparatus which includes a display and a first keyboard joined via a hinge so that the cover can be turned down, and having the first keyboard and a second keyboard joined via a hinge so that the second keyboard can be turned down.

2. Description of the Related Art

In recent years, personal computers, that are typical examples of electronic apparatuses, have been highly sophisticated. Once the personal computer is connected on the Internet, the personal computer can communicate data to or from computers located around the world and get various pieces of information. Moreover, when it comes to portable personal computers, a user can connect his/her personal computer on the Internet at any place away from home. The computer is now usable irrespective of the place and has become indispensable for work. As for displays, a liquid crystal display substitutes for a cathode-ray tube and contributes to downsizing of the display.

In addition to a desktop computer to be used while being immobilized on a desktop in a room, a portable personal computer including a portable liquid crystal display and driven by a battery and, for example, a notebook personal computer (hereinafter, a notebook computer) is rapidly prevailing in the marketplace. The notebook computer generally includes a main unit that is a major portion of the computer, a keyboard unit having a keyboard, and a liquid crystal display that can be turned down on a hinge to engage with the keyboard unit.

The notebook computer is required to be compact because the portability thereof counts. However, the keyboard should be large enough to allow the user to smoothly enter characters. Downsizing of the notebook computer is restricted by the keyboard. A proposal has been made of a portable computer whose keyboard can be folded in the center thereof (refer to Japanese Unexamined Patent Publication No. JP-A-4-281509). In a portable computer, after a cover including a liquid crystal screen is opened to disengage from a keyboard unit, when a right keyboard unit is opened to disengage from a left keyboard unit, the portable computer can be used as a computer.

However, the portable computer disclosed in the publication No. JP-A-4-281509 has only the capability of a computer. When the right keyboard unit is turned down to engage with the left keyboard unit, the portable computer cannot be used as a computer.

SUMMARY OF THE INVENTION

An object of the present invention is to provide a portable electronic apparatus permitting use of a specific feature thereof even with a keyboard is turned down or permitting use of part or all of features thereof according to a limited manipulating method. Another object of the present invention is to provide a compact, multirole, and foldable portable computer that can operate as a CD player with all parts thereof turned down, that, when a cover including a liquid crystal display screen is opened to disengage from a keyboard unit being turned down, permits use of not only the capability of a CD player but also the capability of a DVD player and use of a computing feature which does not require entry of characters, and that, when a right keyboard unit is opened to disengage from a left keyboard unit, permits use of all the features of the personal computer.

According to the first aspect of the present invention intended to accomplish the above object, there is provided a portable electronic apparatus including: a first keyboard unit having a first keyboard; a second keyboard unit having a second keyboard; a first hinge that is interposed between the first and second keyboard units and that allows the second keyboard unit to engage with the first keyboard unit with the first and second keyboards opposed to each other; a display unit having a built-in display; a second hinge that allows the display unit to engage with the back of the second keyboard unit with the second keyboard unit turned down to engage with the first keyboard unit; and an operating unit formed on the back of the second keyboard unit and capable of being manipulated with the second keyboard unit engaged with the first keyboard unit.

According to the second aspect of the present invention intended to accomplish the foregoing object, there is provided a portable electronic apparatus including: a first keyboard unit having a first keyboard; a second keyboard unit having a second keyboard and being joined to the first keyboard unit via a first hinge so that the second keyboard unit can be engaged with the first keyboard unit; and a display unit having a built-in display and being joined to the first keyboard unit via a second hinge. The portable electronic apparatus further includes a remote controller connection terminal, and a first control circuit that, when the power supply of the electronic apparatus is turned on, if the display unit is closed, reproduces data from a disk according to an operational instruction entered at a remote controller connected via the connection terminal.

According to the third aspect of the present invention intended to accomplish the aforesaid object, there is provided a portable electronic apparatus in which: a second keyboard unit is joined to a first keyboard unit, which includes a first keyboard, via a first hinge so that the second keyboard unit can be turned down; a display unit having a built-in display is joined to the first keyboard unit via a second hinge; and when the display unit is turned down on the second hinge, the display unit engages with the turned-down second keyboard unit. The flank of the display unit on the side of the second hinge is formed as an inclined surface that meets at a predetermined angle a side opposite to a side on which the display is exposed. When the display unit is opened with the first keyboard unit placed on a plane, the display unit is left open to the greatest extent with the inclined surface thereof placed on the plane. In this state, the display unit meets the first keyboard at a predetermined angle.

According to the fourth aspect of the present invention intended to accomplish the aforesaid object, there is provided a recording medium in which a program to be run in a portable electronic apparatus is recorded. The electronic apparatus has a second keyboard unit joined to a first keyboard unit, which includes a first keyboard, via a first hinge so that the second keyboard unit can be turned down, and has a display unit, which has a built-in display, joined to the first keyboard unit via a second hinge. When the display unit is turned down on the second hinge, the display unit engages with the second keyboard unit that is turned down. The electronic apparatus has a built-in disk drive. The program detects whether the display unit is open or closed when the power supply of the electronic apparatus is turned on, and instructs the electronic apparatus to control the operation of the disk drive according to whether the display unit is open or closed.

According to a portable electronic apparatus to which the present invention is adapted, the portable electronic apparatus operates as a CD player with all parts thereof turned down. When a cover including a liquid crystal display screen is opened to disengage from a keyboard unit being turned down, the portable electronic apparatus permits use of not only the capability of a CD player but also the capability of a DVD player and permits use of a computing feature that does not require entry of characters. All the features of the portable electronic apparatus are usable with a second keyboard unit opened to disengage from a first keyboard unit. Consequently, the portable electronic computer is designed to be compact and user-friendly.

BRIEF DESCRIPTION OF THE DRAWINGS

The present invention will be more clearly understood from the description as set forth below with reference to the accompanying drawings, wherein:

FIG. 9A and FIG. 9B are flowcharts describing an example of actions to be performed according to the folded state of the portable computer in accordance with the present invention when the power supply of the portable computer is turned on;

FIG. 13A and FIG. 13B are flowcharts describing actions to be performed in the portable computer in accordance with the present invention which has one operating system installed therein.

DESCRIPTION OF THE PREFERRED EMBODIMENTS

Figure 1A:
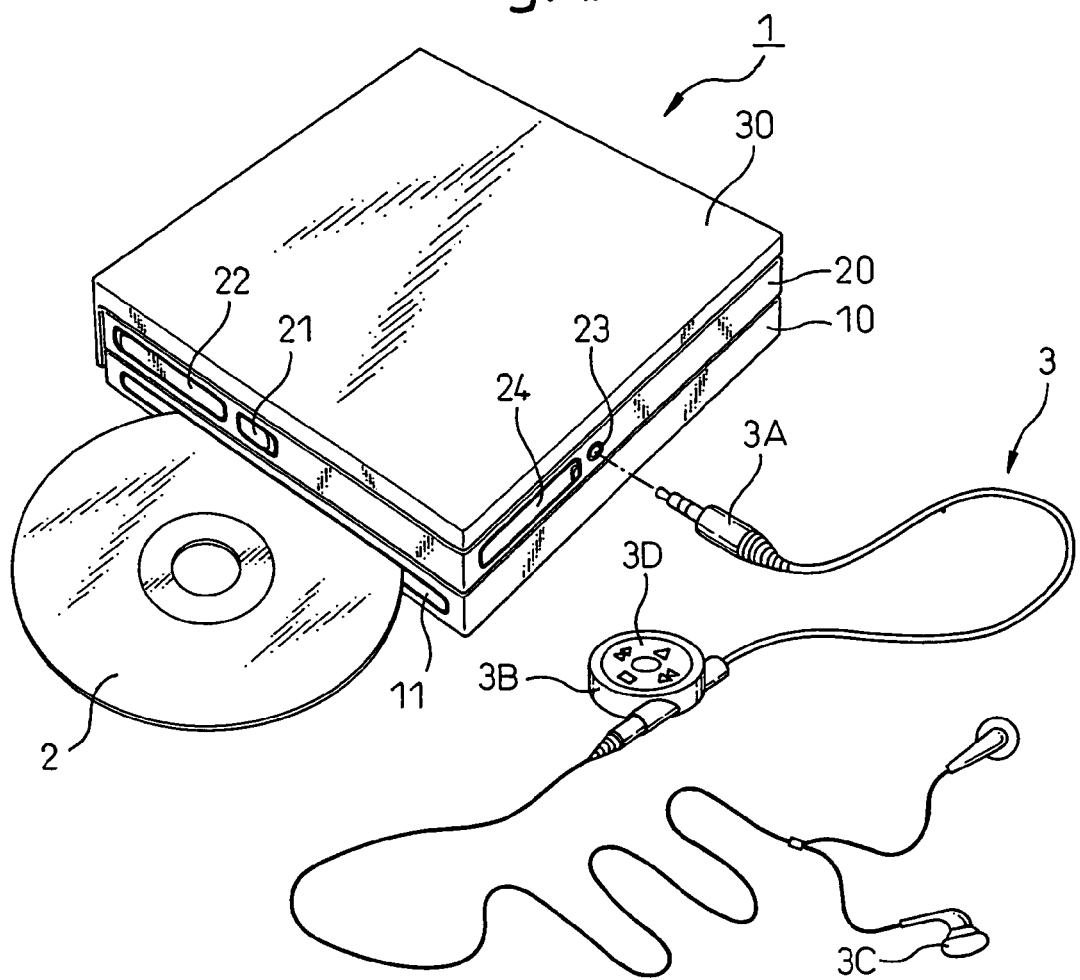
FIG. 1A is a perspective view showing a portable computer, that is a portable electronic apparatus in accordance with the present invention and that is fully folded, viewed from the side of a disk insertion port and a remote controller connection terminal.
Figure 1B:
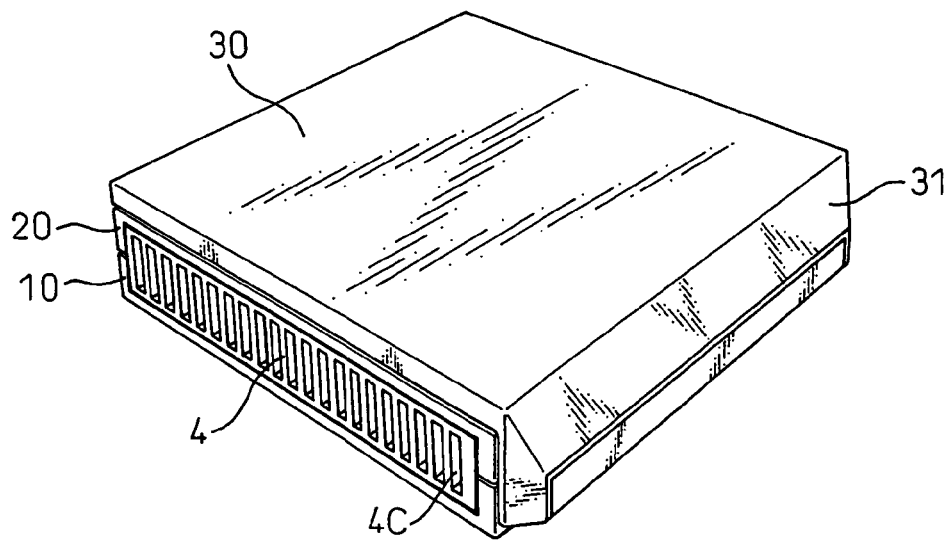
FIG. 1B is a perspective view showing the portable computer shown in FIG. 1A viewed from a side opposite to the side shown in FIG. 1A.

FIG. 1A shows a portable computer 1, which is an example of a portable electronic apparatus in accordance with the present invention and which is fully folded, viewed from the side of an insertion port for a disk 2 and a connection terminal for a remote controller-inclusive headphone 3. FIG. 1B shows the portable computer 1 viewed from the side opposite to the side shown in FIG. 1A. The portable computer 1 in accordance with the present invention includes a first keyboard unit 10, a second keyboard unit 20, and a cover 30. The second keyboard unit 20 is turned down to engage with the first keyboard 10, and the cover 30 covers the second keyboard unit 20.

As shown in FIG. 1A, the first keyboard unit 10 has a disk insertion port 11 through which a disk 2 is inserted. The second keyboard unit 20 has a power switch 21, an external connection connector 22, a headphone jack 23, and a battery insertion port 24 formed therein. Any other necessary connection terminals may be formed in the flanks of the first and second keyboard units 10 and 20 respectively. The remote controller-inclusive headphone 3 having a plug 3A inserted into the headphone jack 23 includes a remote controller 3B connected to the plug 3A, and an inner-ear headphone 3C connected to the remote controller 3B. The remote controller 3B has a multi-select button 3D whose four portions can be pressed in order to control the motion of the disk 2 inserted into the first keyboard unit 10. The button 3D is used to reproduce data recorded in the disk 2, quickly advance the disk, withdraw the disk, or halt the disk.

As shown in FIG. 1B, the first keyboard unit 10 and second keyboard unit 20 are joined via a biaxial hinge member 4 that will be described later. The cover 3 is attached to the first keyboard unit 10 using a hinge that is not shown. An inclined surface 31 communicating with the face of the cover 30 at an angle is formed behind the hinged portion of the cover 30. The inclined surface 31 is, as described later, intended to lock the cover 30 so that when the cover 30 is left open, the cover 30 will meet at a predetermined angle a plane, on which the portable computer 1 is placed, such as a desktop. Moreover, the presence of the inclined surface 30 makes it easy to distinguish the hinge side of the cover 30 from the opening side thereof.

Figure 2A:
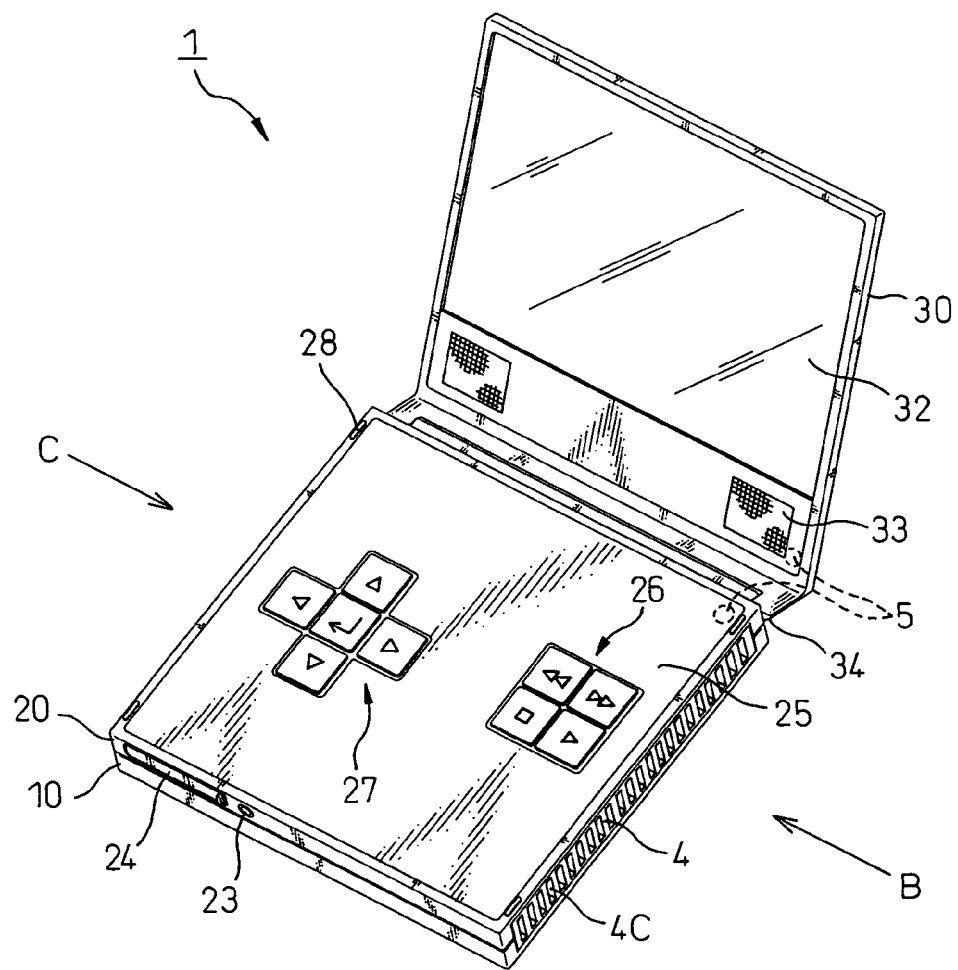
FIG. 2A is a perspective view showing the portable computer in accordance with the present invention, which has a cover with a built-in display opened, viewed from the right front of the portable computer.
Figure 2B:
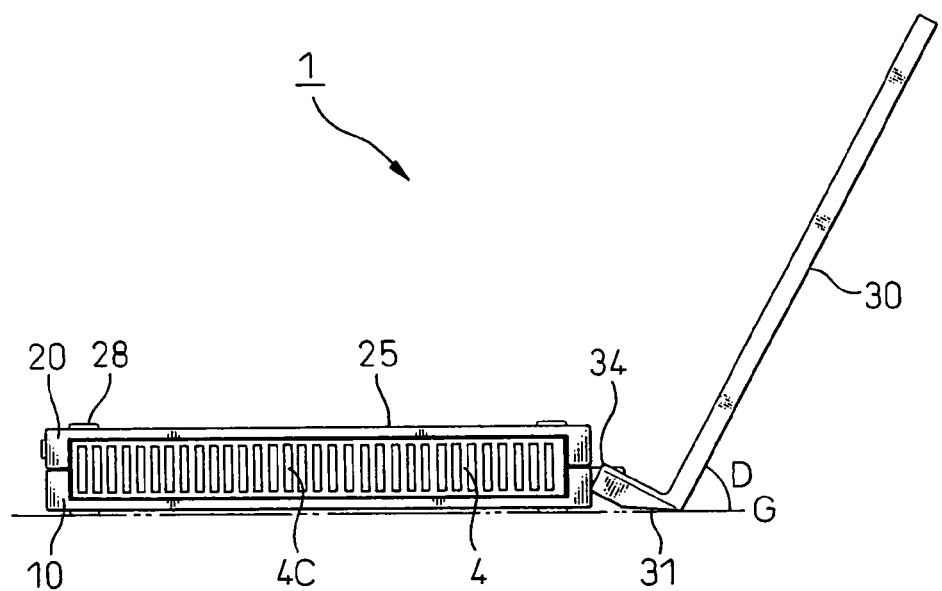
FIG. 2B is a side view showing the portable computer in accordance with the present invention shown in FIG. 2A viewed in the direction of arrow B.
Figure 2C:
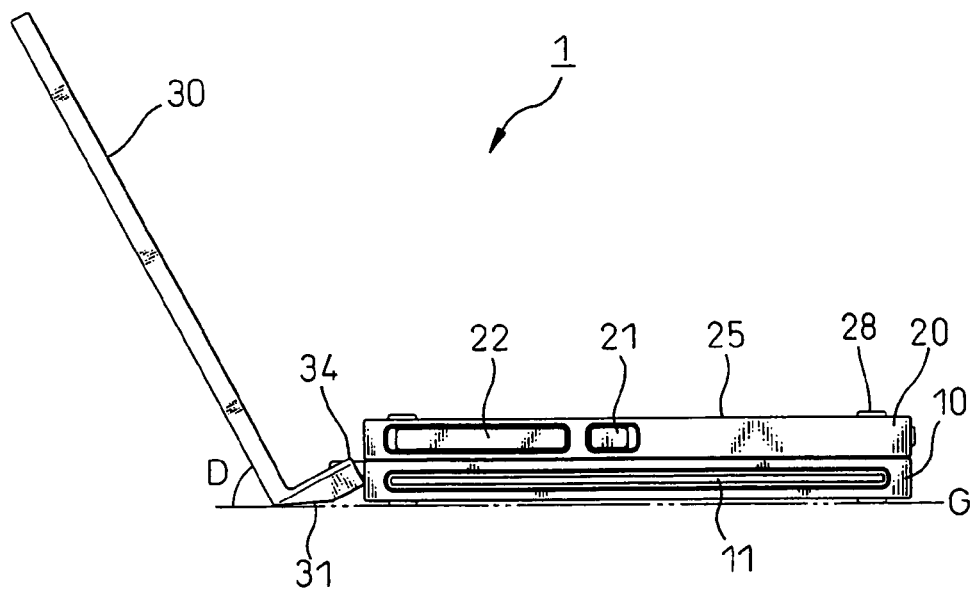
FIG. 2C is a side view showing the portable computer in accordance with the present invention shown in FIG. 2A viewed from the direction of arrow C.

FIG. 2A shows the portable computer 1 in accordance with the present invention, which has the cover 30 with a built-in display 32 left open, with viewed from the portable computer. FIG. 2B shows the portable computer 1 shown in FIG. 2A viewed from the direction of arrow B. FIG. 2C shows the portable computer 1 shown in FIG. 2A viewed from the direction of arrow C. The display 32 is formed with a liquid crystal panel and disposed on the back of the cover 30. Two loudspeakers 33 are disposed in a portion below the display 32 so that stereophonic sounds will be radiated through the loudspeakers. The cover 30 can pivot on a hinge 34.

As shown in FIG. 2A, a first function key 26 is disposed on a portion of the back 25 of the second keyboard unit 20, which appears when the cover 30 is opened, that is seen on the right side of the back with an observer's eye opposed to the display 32, and a second function key 27 is disposed on a left portion of the back. The first function key 26 includes four buttons and has the same features as the remote controller 3B shown in FIG. 1A has. When a disk is loaded in the first keyboard unit 10, the disk can be treated using the first function key 26. In the present embodiment, features of reproduction, halt, quick advancement, and withdrawal are allocated to the four respective buttons.

Moreover, the second function key 27 includes five buttons. The center button serves as an Enter key. The buttons located above, below, or the right or left side of the Enter key serve as cursor movement keys for use in moving a cursor, which appears on the display 32, upwards, downwards, rightwards, or leftwards.

The first function key 26 disposed on the back 25 of the second keyboard unit 20 is positioned so that when a user holds the assembly of the first and second keyboard units 10 and 20 in his/her hands, the user can press the first function key 26 with his/her right-hand thumb. Likewise, the second function key 27 is positioned so that when a user holds the assembly of the first and second keyboard units 10 and 20 in his/her hands, the user can press the second function key 27 with his/her left-hand thumb. Thus, FIG. 2A illustrates the first function key 27 and second function key 27 serving as an operating unit of the present invention.

As shown in FIG. 2B and FIG. 2C, when the portable computer 1 is placed on a plane G and the cover 30 is turned on the hinge 34 to become open, the inclined surface 31 shown in FIG. 1B abuts on the plane G. Consequently, the cover 30 is locked to meet the plane G at an angle D. The angle D is an angle allowing a user to easily view an image displayed on the display 32 when the user looks down on the display 32 including a liquid crystal display device.

Furthermore, a bushing 28 made of a rubber is disposed at four corners of the back 25 of the second keyboard unit 20 so that the bushings will prevent the cover 30 from abutting on the back 25 of the second keyboard unit 20 when the cover 30 is closed, and the bushings will serve as legs standing on the plane G when the second keyboard unit 20 is opened. In addition, at least one first sensor 5 is disposed on the opposed sides of the second keyboard unit 20 and cover 30 so that the first sensor 5 will detect whether the cover 30 is closed or opened to engage with or disengage from the second keyboard unit 20.

Figure 3A:
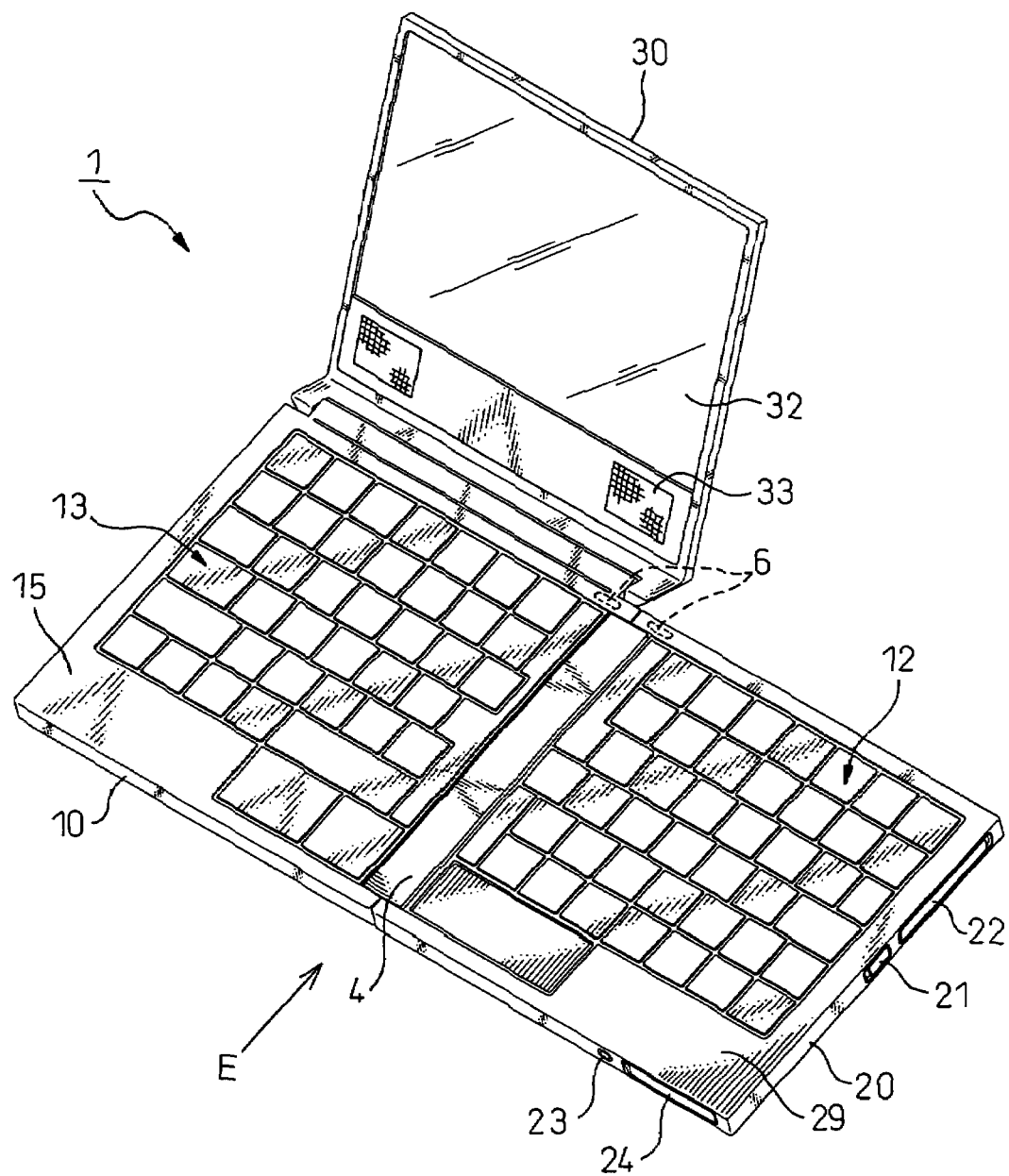
FIG. 3A is a perspective view showing the portable computer in accordance with the present invention that has a second keyboard unit including a right hand-manipulated keyboard opened from the state shown in FIG. 2A.
Figure 3B:
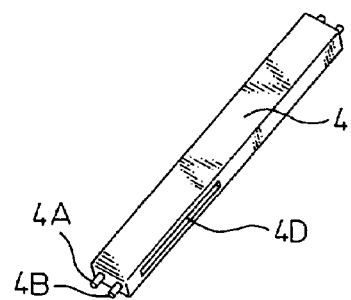
FIG. 3B is a perspective view showing a hinge via which first and second keyboard units included in the portable computer shown in FIG. 3A are joined.
Figure 3C:
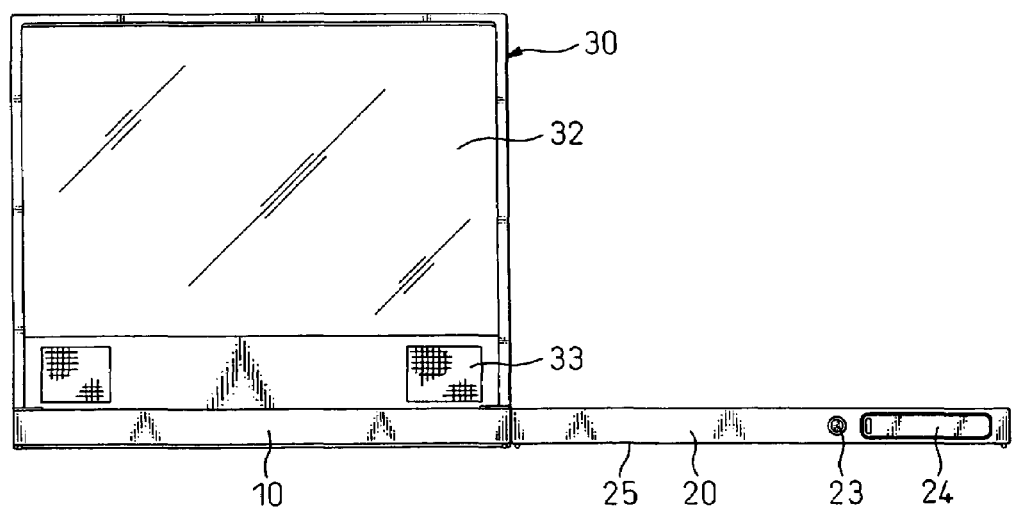
FIG. 3C is a front view showing the portable computer shown in FIG. 3A viewed from in front of the portable computer.

FIG. 3A shows the portable computer 1 in accordance with the present invention with the second keyboard unit 20 opened from the state shown in FIG. 2A. FIG. 3B shows the hinge member 4 that joins the first and second keyboard units 10 and 20 of the portable computer 1 shown in FIG. 3A. FIG. 3C shows the portable computer 1 shown in FIG. 3A viewed from the portable computer (in a direction of arrow E). A keyboard 13 to be manipulated with a left hand is formed on the face 15 of the first keyboard unit 10, and a keyboard 12 to be manipulated with a right hand is formed on the face 29 of the second keyboard unit 20. When the second keyboard unit 20 is opened to disengage from the first keyboard unit 10, both keyboards appear. Herein, a keyboard having keys arranged in a predetermined manner is divided into a right hand-manipulated portion and a left hand-manipulated portion. The right hand-manipulated portion is allocated to the second keyboard unit 20 as the right hand-manipulated keyboard 12, and the left hand-manipulated portion is allocated to the first keyboard unit 10 as the left hand-manipulated keyboard 13. The key arrangement is not limited to any specific one. Either a known key arrangement or a unique key arrangement may be adopted as long as the key arrangement will not hinder keystrokes when it is adopted for the portable computer 1.

As shown in FIG. 3B, the hinge member 4 includes a first hinge shaft 4A and a second hinge shaft 4B. The shafts 4A and 4B are parallel to each other. The shaft 4A is attached to the first keyboard unit 10, and the shaft 4B is attached to the second keyboard unit 20. As the hinge member 4 has the two shafts 4A and 4B, when the second keyboard unit 20 is turned down to engage with the first keyboard unit 10, one side of the hinge member 4 is, as shown in FIG. 2A, flush with the flanks of the first and second keyboard units 10 and 20. When the second keyboard unit 20 is opened to disengage from the first keyboard unit 10, the other side of the hinge member 4 is, as shown in FIG. 3C, flush with the faces 15 and 29 of the first and second keyboard units 10 and 20.

As shown in FIG. 2A and FIG. 2B, one side of the hinge member 4 has a plurality of concave parts 4C. The plurality of concave parts 4C is useful in releasing heat that is dissipated from the insides of the first and second keyboard units 10 and 20 when the portable computer 1 is put to use in the state shown in FIG. 1A and FIG. 1B or in FIG. 2A. Moreover, the hinge member 4 has, as shown in FIG. 3B, a slit 4D formed in both the flanks thereof that are opposed to the flanks of the first and second keyboard units 10 and 20 respectively when the second keyboard unit 20 is opened to disengage from the first keyboard unit 10. The slits 4D are used to pass a flexible cable over which two groups into which internal circuits are divided and which are distributed to the insides of the first and second keyboard units 10 and 20 respectively as described later are interconnected.

Furthermore, at least one second sensor 6 that detects whether the second keyboard unit 20 is closed to engage with the first keyboard unit 10 is disposed on the opposed surfaces of the first and second keyboard units 10 and 20 near the hinge member 4. The second sensor 6 is activated when the second keyboard unit 20 is closed to engage with the first keyboard unit 10, and inactivated when the second keyboard unit 20 is opened.

Figure 4:
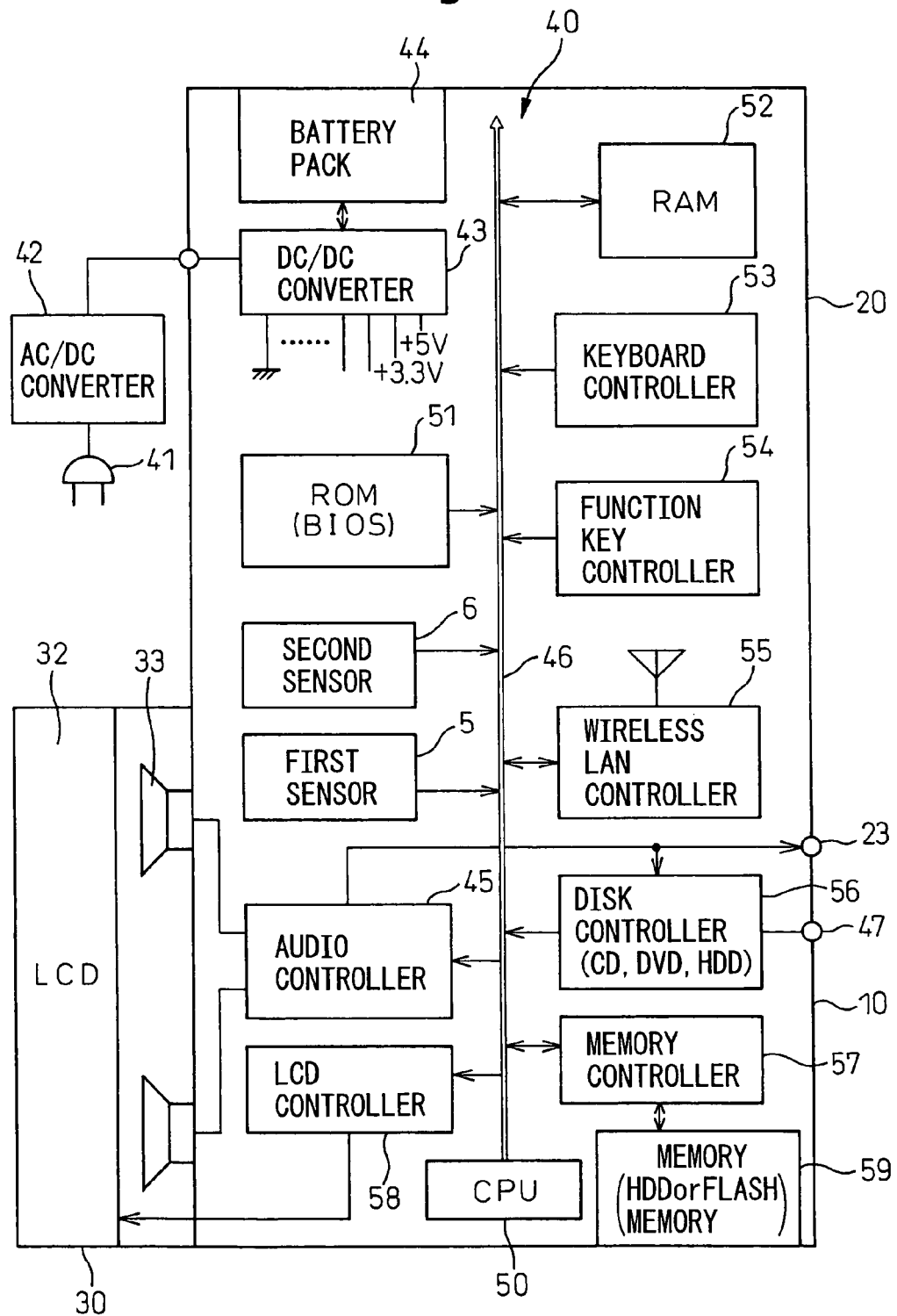
FIG. 4 is a block circuit diagram showing part of the internal components of the portable computer in accordance with the present invention.

FIG. 4 is a block circuit diagram showing an example of internal circuits 40 incorporated in the portable computer 1 in accordance with the present invention. The groups into which the internal circuits 40 are divided and which are incorporated in the first and second keyboard units 10 and 20 respectively are interconnected over the flexible cable. Herein, the internal circuits 40 are not shown as divided into the groups that are incorporated in the first and second keyboard units 10 and 20 respectively. In the present embodiment, the internal circuits 40 incorporated in the portable computer 1 are divided into the two groups that are incorporated in the first and second keyboard units 10 and 20 respectively. The place where the internal circuits 40 are incorporated is not limited to the first and second keyboard units 10 and 20 and may be the cover.

As shown in FIG. 4, a direct (dc) voltage into which an alternating (ac) voltage received through a power plug 41 inserted into a mains outlet is converted by an AC/DC converter 42 is supplied to the internal circuits 40. The received dc voltage is converted into various voltages by a DC/DC converter 43, and the voltages are supplied to the internal circuits 40 that need predetermined voltages. The DC/DC converter 43 shall include a dc voltage conversion circuit and a control circuit so as to charge a battery 44 incorporated in the second keyboard unit 20.

The internal circuits 40 include a CPU 50 responsible for control. A ROM 51 in which software including a BIOS is stored, a RAM 52 in which data is stored, a keyboard controller 53, a function key controller 54, a wireless LAN controller 55, a disk controller 56, a memory controller 57, and an LCD controller 58 that controls display on a liquid crystal included in the display are connected to the CPU 50 over an internal bus 46. The memory controller 57 controls a memory (a hard disk drive (HDD) or a flash memory) 59 incorporated in the first or second keyboard unit 10 or 20.

The first and second sensors 5 and 6 are connected on the internal bus 46. The loudspeakers 33 incorporated in the cover 30 are driven by an audio controller 45 connected on the internal bus 46. The headphone jack 23 is connected to the audio controller 45. An output terminal 47 via which image data reproduced from a disk is transmitted is connected to the disk controller 56.

Figure 5:
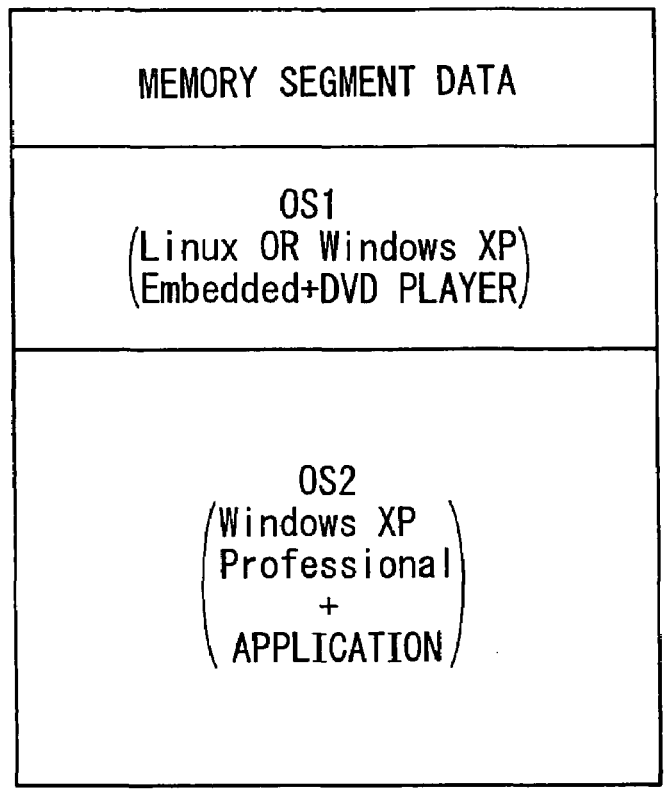
FIG. 5 is an explanatory diagram showing an example of software to be installed in the portable computer in accordance with the present invention.

FIG. 5 shows an example of software installed in the memory 59 incorporated in the portable computer 1 in accordance with the present invention. In the present embodiment, two operating systems are stored in the memory 59. One of the operating systems is an operating system OS1, and the other is an operating system OS2. The operating system OS1 provides, unlike the operating system OS2, a limited number of features (for example, Linux® or Windows XP Embedded®). Application software dedicated to driving of such a disk as a DVD or a CD is run on the operating system OS1. Moreover, the operating system OS2 is software (for example, Windows XP® Professional or Home Edition and applications) providing the portable computer 1 with various features. The operating system OS1 provides a smaller number of features than the operating system OS2 does. Therefore, the startup time required for the operating system OS1 is shorter than that required for the operating system OS2. Moreover, when the operating system must be changed from the operating system OS1 to the operating system OS2, the portable computer 1 is restarted.

Figure 6:
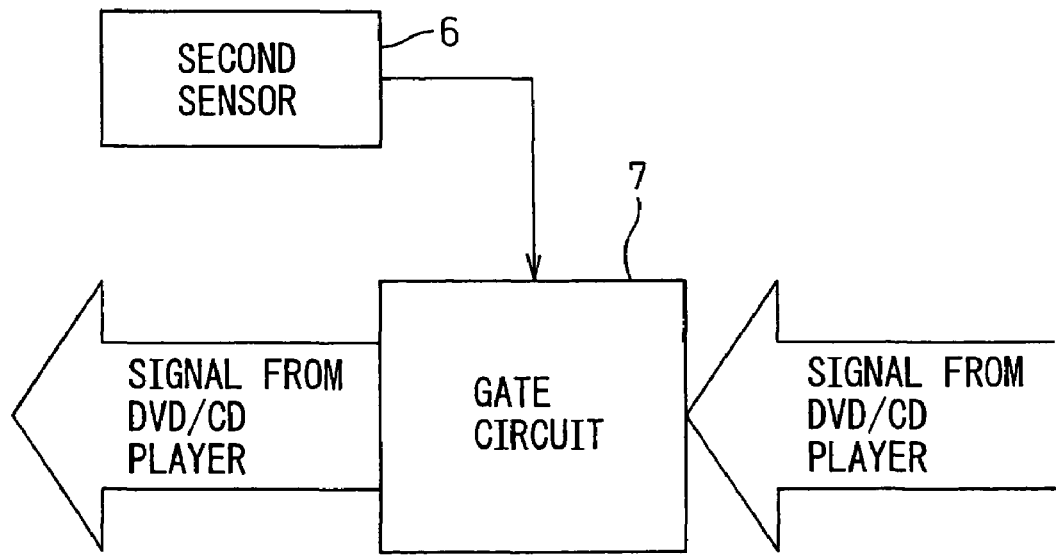
FIG. 6 is an explanatory diagram for use in explaining blockage of a signal, which is sent from a DVD/CD player operation button, by a second sensor and a gate circuit.

FIG. 6 is an explanatory diagram showing blockage of a signal sent from the first function key 26, which includes DVD/CD player buttons, by the second sensor 6 and a gate circuit 7. In the present embodiment, when the second sensor 6 is active or in an on state, that is, the second keyboard unit 20 is turned down to engage with the first keyboard unit 10, the gate circuit 7 is made in response to an on-state signal sent from the second sensor 6. Consequently, the signal sent from the first function key 26 is transferred to the disk controller 56 shown in FIG. 4. In contrast, when the second keyboard unit 20 is opened to disengage from the first keyboard unit 10, the gate circuit 7 is broken in response to an off-state signal sent from the second sensor 6. Consequently, the signal sent from the first function key 26 is blocked and not transferred to the disk controller 56 shown in FIG. 4.

Figure 7:
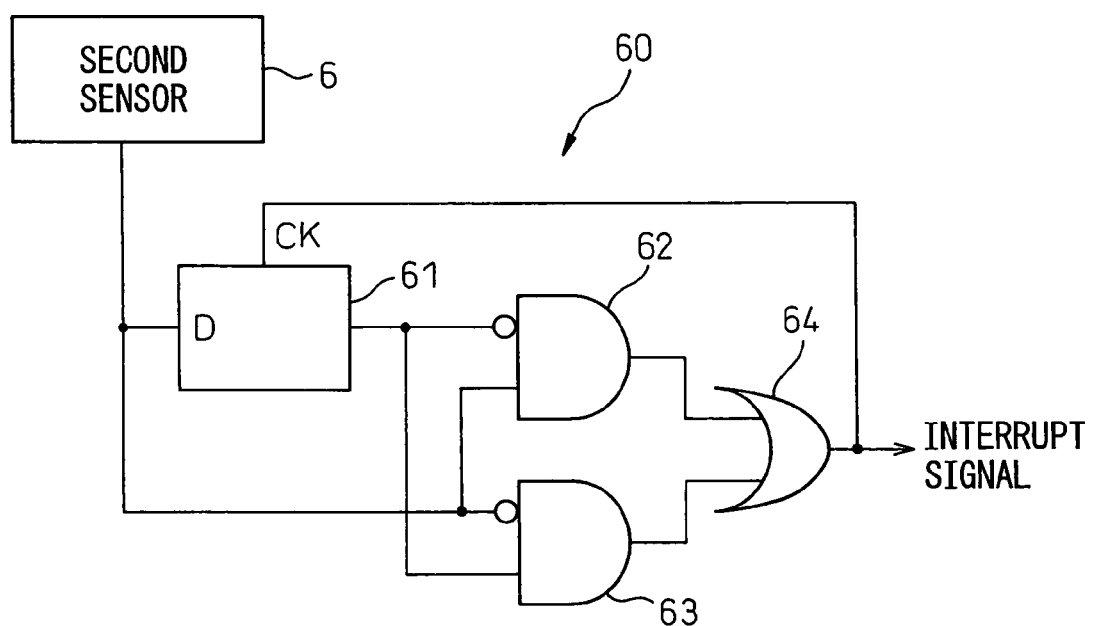
FIG. 7 is a circuit diagram showing an example of a circuit that produces an interrupt signal according to whether the second sensor is activated or inactivated.

FIG. 7 shows an example of an interrupt signal generation circuit 60 that generates an interrupt signal according to whether the second sensor 6 is activated or inactivated. The interrupt signal generation circuit 60 includes a delay flip-flop 61, two AND circuits 62 and 63, and an OR circuit 64. One of the output terminals of the second sensor 6 is connected to one input terminal of the AND circuit 62, and the other output terminal is connected to an inverting input terminal of the AND circuit 63. One of the outputs of the second sensor 6 having passed through the delay flip-flop 61 is applied to one of the input terminals of the AND circuit 63, and the other output is applied to the inverting input terminal of the AND circuit 62. The output terminals of the AND circuits 62 and 63 respectively are connected to the two input terminals of the OR circuit 64. The output terminal of the OR circuit 64 is connected to the clock input terminal CK of the delay flip-flop 61. Owing to this circuitry, whether an output of the second sensor 6 changes from an on-state signal to an off-state signal or vice versa, the OR circuit 64 transmits an interrupt signal.

Figure 8A:
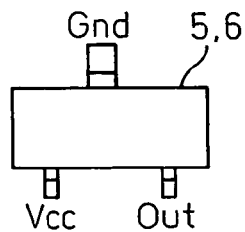
FIG. 8A is a plan view showing an example of a sensor adopted as the first and second sensors.
Figure 8B:
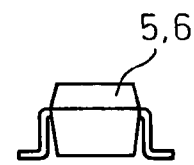
FIG. 8B is a side view showing the sensor shown in FIG. 8A.
Figure 8C:
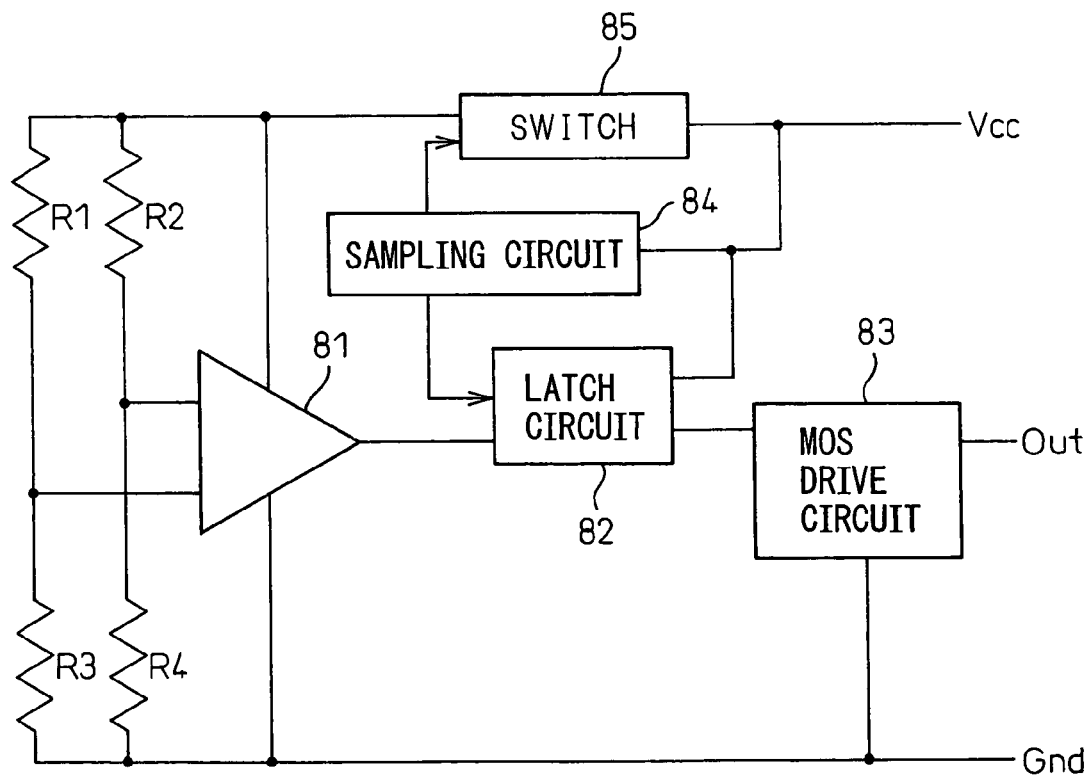
FIG. 8C is a circuit diagram showing the internal components of the sensor shown in FIG. 8A and FIG. 8B.

FIG. 8A is a plan view showing an example of a sensor adopted as the first and second sensors 5 and 6 included in the portable computer 1 in accordance with the present invention. FIG. 8B is a side view showing the sensor adopted as the sensors 5 and 6 and shown in FIG. 8A. FIG. 8C is a circuit diagram showing the internal configuration of the sensor adopted as the sensors 5 and 6 and shown in FIG. 8A and 8B. In the present embodiment, the sensors 5 and 6 each have a power terminal Vcc, a ground terminal Gnd, and an output terminal Out. The sensors 5 and 6 each include four magneto-resistors R1 to R4, an operational amplifier 81, a latch circuit 82, a MOS drive circuit 83, a sampling circuit 84, and a switch 85.

The first and second sensors 5 and 6 utilize a magneto-resistance effect and exploit the phenomenon that the resistances of the magneto-resistors R1 to R4 that are formed using a thin film whose main component is a ferromagnetic metal such as Ni, Fe, or Co vary with a change in a magnetic field strength. The action of a sensor utilizing the magneto-resistance effect is already known, and a description of the actions will be omitted.

According to the present invention, whether the cover is turned down and whether the keyboard unit is turned down are detected based on whether the first and second sensors 5 and 6 are activated or inactivated. Specifically, when the cover is turned down and closed, the first sensor 5 transmits an on-state signal. When the cover is opened, the first sensor 5 transmits an off-state signal. When the keyboard to be manipulated with a right hand (second keyboard unit) is closed (turned down), the second sensor 6 transmits an on-state signal. When the right hand-manipulated keyboard is opened, the second sensor 6 transmits an off-state signal.

Now, a description will be made of the actions to be performed in the portable computer 1 in accordance with the present invention, which has the foregoing components, on the basis of whether the cover 1 and second keyboard unit 30 are turned down.

(1) When the cover 30 is turned down (FIG. 1A and FIG. 1B)

The portable computer 1 operates as a CD player with the remote controller-inclusive headphone 3 connected to the second keyboard unit 20.

(2) When the cover 30 alone is opened (FIG. 2A to FIG. 2C)

If the second keyboard unit 20 is turned down to engage with the first keyboard unit 10, the portable computer 1 operates as a CD player or a DVD player. An image browser and other simple applications installed in the computer may be utilized by moving a cursor or the like using the second function key 27.

(3) When the second keyboard unit 20 is opened (FIG. 3A and FIG. 3C)

The portable computer 1 operates as a computer itself according to manipulations performed on the full keyboard.

FIG. 9A and FIG. 9B are flowcharts describing an example of actions to be performed based on the folded state of the portable computer when the power supply of the portable computer in accordance with the present invention is turned on. In the present embodiment, the operating system (OS1) having a limited number of features, software that drives or controls a disk and runs on the operating system OS1, and software (OS2) that controls computing actions are stored in the memory 59 shown in FIG. 4.

When the power supply of the portable computer is turned on, the basic input/output system (BIOS) stored in the ROM 51 is started at step 901. At the next step 902, the first sensor is checked to see if it is active in order to determine whether the cover is open. If the first sensor is active, that is, if the cover is closed, control is passed to step 903. A determination is made of whether the operational condition for a CD player is met. The operational condition for a CD player is that the remote controller-inclusive headphone 3 is, as shown in FIG. 1A, connected to the second keyboard unit 20. If the remote controller-inclusive headphone 3 is connected to the second keyboard unit 20, the operating system OS1 described in conjunction with FIG. 5 is read at step 904. The portable computer (PC in the drawings) is allowed to operate as a CD player, and the routine is terminated. If the operational condition for a CD player is not recognized to be met at step 903, the routine is terminated.

On the other hand, if the first sensor is not recognized to be activated at step 902, that is, if the cover is recognized to be open, control is passed to step 905. The display (LCD) formed with a liquid crystal panel is operated. At the next step 906, the second sensor is checked to see if it is activated.

If the second sensor is activated, that is, the second keyboard unit 20 is closed, control is passed from step 906 to step 907. The operating system OS1 described in conjunction with FIG. 5 is read. At the next step 908, a determination is made whether a disk has been inserted through the disk insertion port 11 and loaded in the first keyboard unit. If the disk is recognized to be loaded, control is passed to step 909. Disk data is read from the loaded disk.

At the next step 910, the disk data read at step 909 is checked to see if the disk is a DVD. If the disk is not recognized as a DVD but recognized as a CD, control is passed to step 911. CD player application software is invoked so that the portable computer will operate as a CD player. After invoking the CD player application software is completed at step 911, control is passed to step 912. A command for invoking any of the features associated with the respective buttons included in the first and second function keys is executed within the CD player application software according to a manipulation performed on any of the buttons included in the first and second function keys.

On the other hand, if the disk is recognized as a DVD at step 910, control is passed to step 913. DVD player application software is invoked so that the portable computer will operate as a DVD player. After the invoking of the DVD player application software is completed at step 913, control is passed to step 914. A command for invoking any of the features associated with the respective buttons included in the first and second function keys is executed within the DVD player application software according to a manipulation performed on any of the buttons included in the first and second function keys.

If the disk is not recognized to be loaded at step 908, the routine is terminated. When single application software into which the CD player application software and DVD player application software are integrated is employed, the integrated application software is invoked at each of steps 911 and 913. Feature commands dependent on a disk type are assigned to the buttons included in the first and second function keys.

If the second sensor is recognized to be inactivated at step 906, that is, if the second keyboard unit is fully open and the keyboard of the first keyboard unit to be manipulated with a left hand and the keyboard of the second keyboard unit to be manipulated with a right hand are exposed, control is passed from step 906 to 915. At step 915, the operating system OS2 described in conjunction with FIG. 5 is read in order to allow the portable computer to operate as a computer itself. The routine is then terminated.

Figure 10:
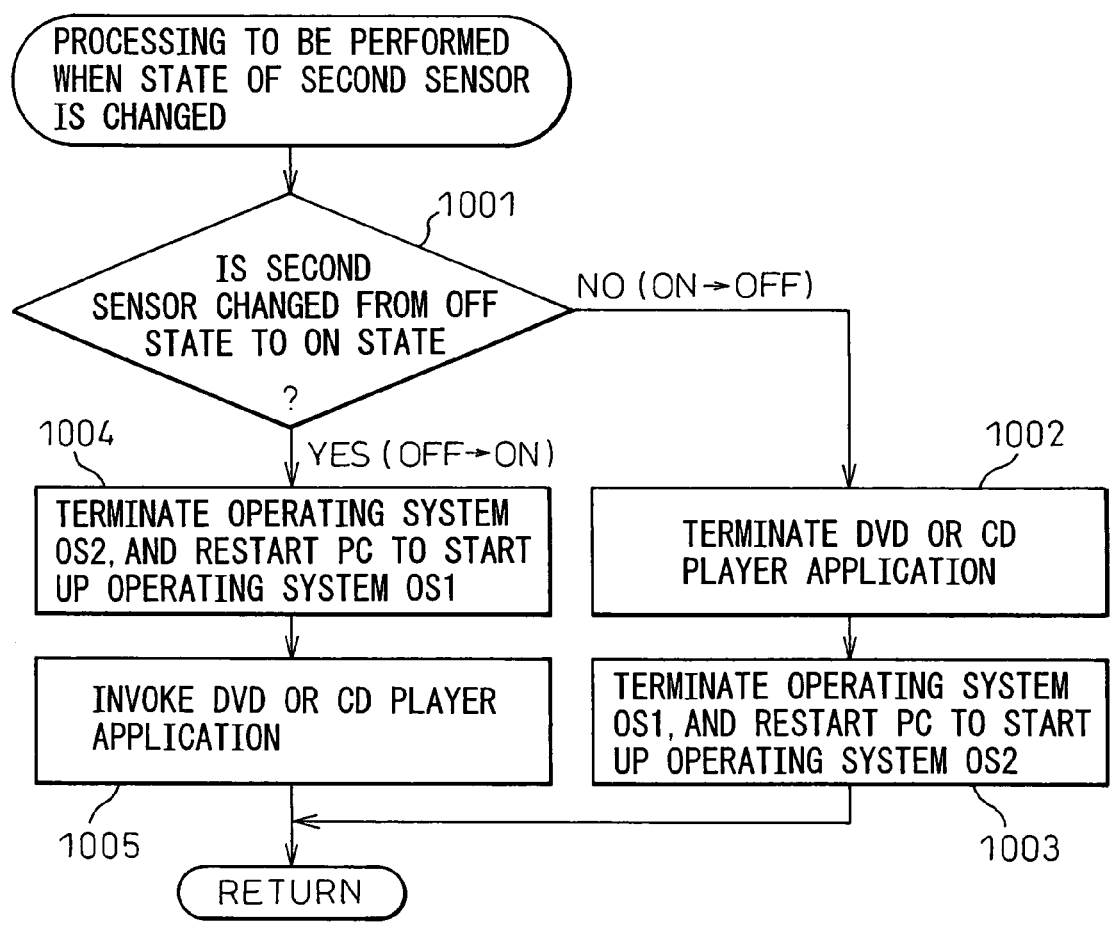
FIG. 10 is a flowchart describing an example of actions to be performed in the portable computer in accordance with the present invention (which has two operating systems installed therein), which has a cover alone opened, when the state of the second sensor has changed.

Next, processing to be performed in case when the cover is left open and the second keyboard unit is opened or closed to disengage from or engage with the first keyboard unit, will be described in conjunction with the flowchart of FIG. 10. The processing described in the flowchart is adapted to a case where the portable computer has two operating systems (OS1 and OS2) installed therein, and is executed in response to an interrupt signal described in conjunction with FIG. 7.

At step 1001, the second sensor is checked to see if it is activated, that is, changed from an off state to an on state. If the second sensor is recognized to be changed from the on state to the off state at step 1001, it means that the second keyboard unit is opened. The DVD or CD player application is terminated at step 1002, and the operating system OS1 is terminated at the next step 1003. The portable computer is restarted in order to start up the operating system OS2, and the routine is terminated.

On the other hand, if the second sensor is recognized to be changed from the off state to the on state at step 1001, it means that the second keyboard unit is turned down. The operating system OS2 is terminated at step 1004, and the portable computer is restarted in order to start up the operating system OS1. At the next step 1005, the DVD or CD player application is invoked, and the routine is terminated.

Figure 11:
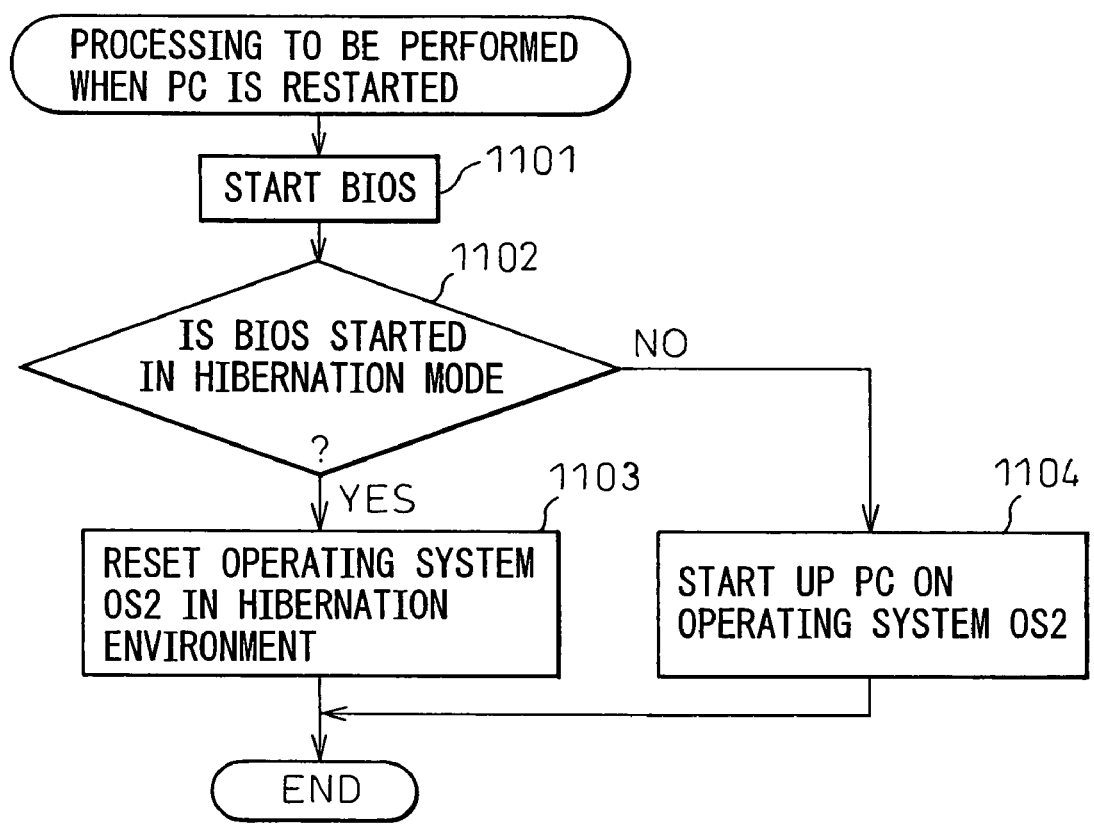
FIG. 11 is a flowchart describing an example of actions to be performed when the portable computer in accordance with the present invention is restarted.

FIG. 11 is a flowchart describing actions to be performed in a case where when the portable computer in accordance with the present invention is restarted and the operating system OS2 is started up. When the portable computer is restarted, the BIOS is started at step 1101. At the next step 1102, a determination is made of whether the BIOS is started in a hibernation mode. If the BIOS is recognized to be started in the hibernation mode at step 1102, control is passed to step 1103. The operating system OS2 is reset in the hibernation environment, and the routine is terminated. On the other hand, if the BIOS is not recognized to be started in the hibernation mode at step 1102, control is passed to step 1104. The operating system OS2 is started up, and the routine is terminated.

Figure 12A:
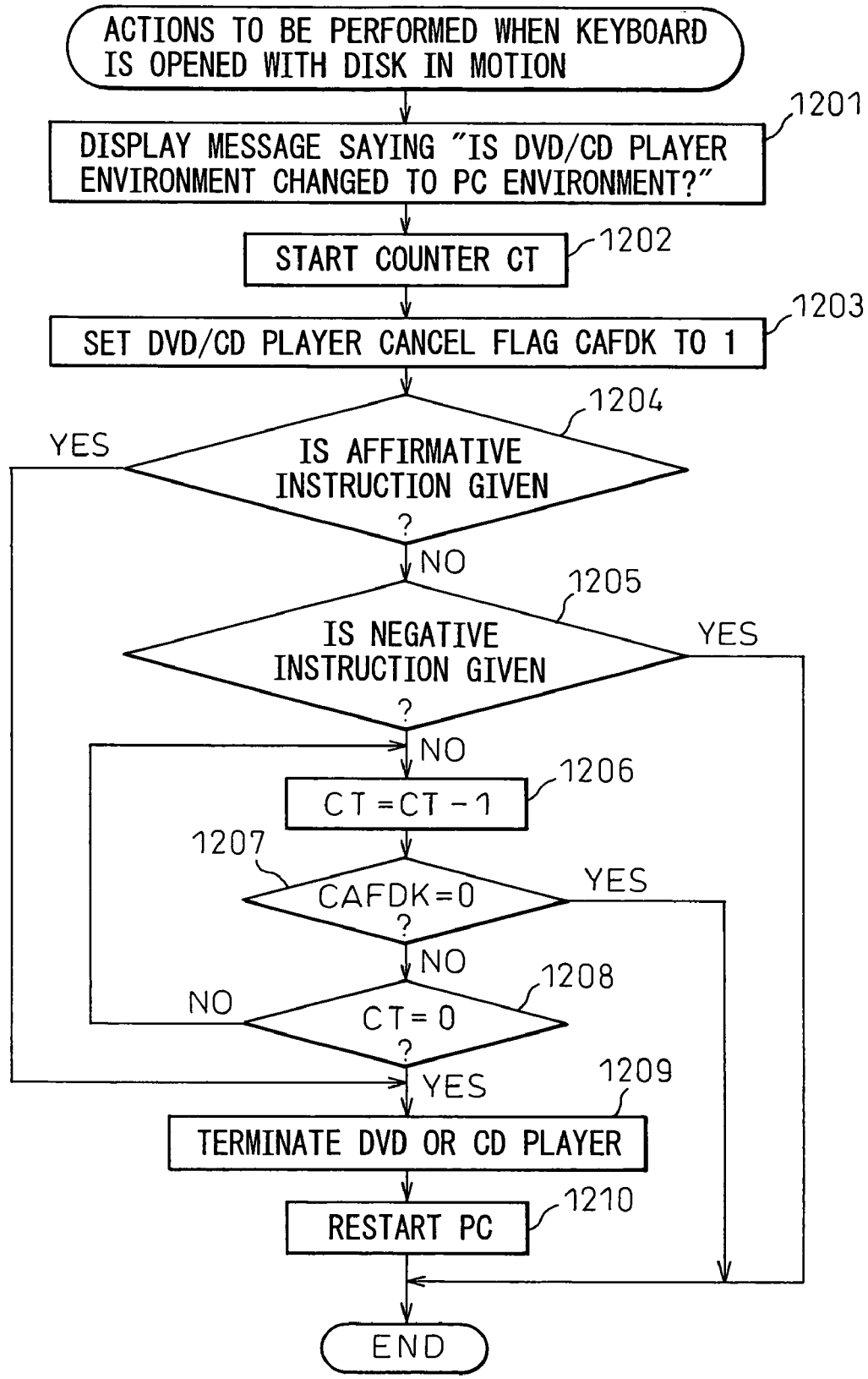
FIG. 12A is a flowchart describing an example of actions to be performed in the portable computer in accordance with the present invention (which has two operating systems installed therein), in which a disk is in operation, when the second keyboard unit is opened.
Figure 12B:
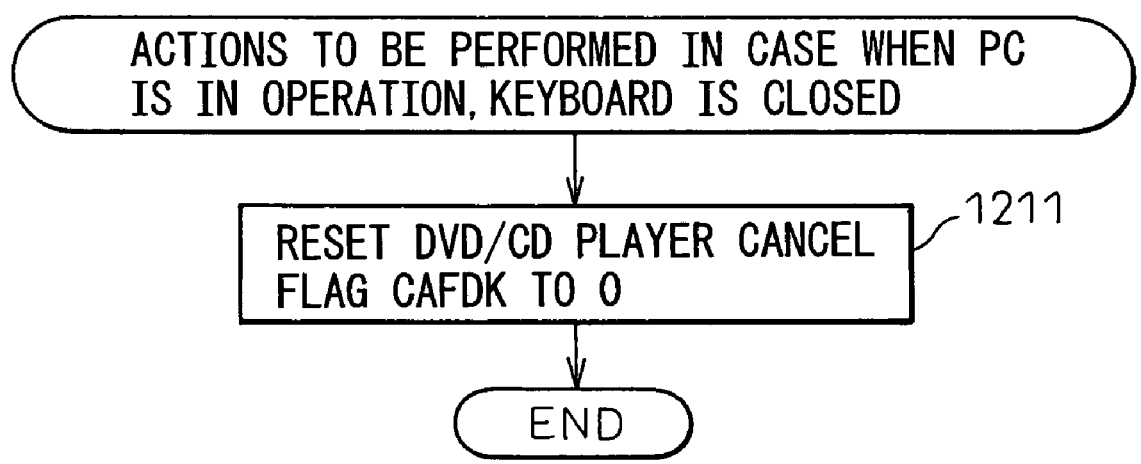
FIG. 12B is a flowchart describing interruption to be performed in a case where when the portable computer in accordance with the present invention is in operation, the keyboard is closed.

FIG. 12A is a flowchart describing an example of actions to be performed when the second keyboard unit is opened with the cover alone left open in a case where a disk, in the portable computer in accordance with the present invention, is in motion. In this case, at step 1201, a message asking "Is the DVD or CD player environment to be changed to the portable computer environment?" is displayed on the display included in the cover. At step 1202, a counter CT that counts the number of times a specific cycle is repeated so as to determine the elapse of a predetermined time is started. At step 1203, a DVD/CD player cancel flag CAFDK is set to 1. The flag CAFDK is, as described at step 1211 in FIG. 12B, reset to 0 when the second keyboard unit is closed.

At step 1204, a determination is made of whether an affirmative reply, Yes, is returned to the message displayed at step 1201 (for example, an alphabetic key Y included in the keyboard is pressed). If the affirmative reply, Yes, is returned to the message displayed at step 1201, control is passed to step 1209. The DVD or CD player is terminated, and the portable computer is restarted at step 1210. The routine is then terminated.

On the other hand, if the affirmative reply, Yes, is not returned at step 1204, a determination is made whether a negative reply, No, is returned to the message, which is displayed at step 1201, at step 1205 (for example, whether an alphabetic key N included in the keyboard is pressed). If the negative reply, No, is returned to the message displayed at step 1201, the DVD or CD player environment is left intact, and the routine is terminated.

In contrast, if no reply is returned to the inquiry made at step 1201, control is passed to step 1206. The value of the counter CT started at step 1202 is decremented by one. At step 1207, the DVD/CD player cancel flag CAFDK is checked to see if it is reset to 0 because the second keyboard unit is turned down. If the flag CAFDK is reset to 0, the routine is terminated. If the flag CAFDK is not reset to 0, the value of the counter CT is checked at step 1208 to see if it is 0. If the counter value is not 0, control is returned to step 1206. If the counter value is 0, control is passed to step 1209. The DVD or CD player is forcibly terminated. At step 1210, the portable computer is restarted and the routine is terminated.

In the present embodiment, as described in conjunction with FIG. 5, the two operating systems (OS1 and OS2) are stored in the memory. Alternatively, the operating system OS2 alone may be stored in the memory and the operating system OS1 may be excluded. FIG. 13 is a flowchart describing an example of actions to be performed based on the folded state of the portable computer when the power supply of the portable computer in accordance with the present invention is turned on in a case where only one operating system is stored in the memory. The same actions as those described in FIG. 9 will be assigned the same step numbers.

When the power supply of the portable computer is turned on, first, the BIOS stored in the ROM 51 is started at step 901. At the next step 1301, the operating system stored in the memory 59 is read. At the next step 902, the first sensor is checked to see if it is active in order to determine whether the cover is open. If the first sensor is active, control is passed to step 903. A determination is made of whether the operational condition for a CD player is met. If the operational condition for a CD player is recognized to be met, the personal computer is operated as a CD player according to an application running on the operating system at step 1302. The routine is then terminated. If the operational condition for a CD player is not recognized to be met at step 903, the routine is terminated.

On the other hand, if the first sensor is not recognized to be active at step 902, that is, if the cover is recognized to be open, control is passed to step 905. The liquid crystal display device (LCD) is then started. At the next step 906, the second sensor is checked to see if it is active. If the second sensor is recognized to be inactive at step 906, that is, if the second keyboard unit is left fully open and the keyboard of the first keyboard unit to be manipulated with a left hand and the keyboard of the second keyboard unit to be manipulated with a right hand are exposed, control is passed from step 906 to step 1303. At step 1303, the portable computer is operated as the computer itself on the operating system read at step 1301, and the routine is terminated.

On the other hand, if the second sensor is recognized to be active at step 906, that is, if the second keyboard unit 20 is closed, control is passed from step 906 to step 908. At step 908, a determination is made whether a disk has been inserted through the disk insertion port 11 and loaded in the first keyboard unit 10. If the disk is recognized to have been loaded, control is passed to step 909. Disk data is then read from the loaded disk.

At the next step 910, the disk data read at step 909 is checked to see if the disk is a DVD. If the disk is not recognized as a DVD but recognized as a CD, control is passed to step 911. The CD player application software is invoked so that the portable computer will operate as a CD player. After invoking the CD player application software is completed at step 911, control is passed to step 912. A command for invoking any of the features associated with the respective buttons included in the first and second function keys is executed within the CD player application software according to a manipulation performed on any of the buttons included in the first and second function keys.

On the other hand, if the disk is recognized as a DVD at step 910, control is passed to step 913. The DVD player application software is invoked so that the portable computer will operate as a DVD player. After the invoking of the DVD player application software is completed at step 913, control is passed to step 914. A command for invoking any of the features associated with the respective buttons included in the first and second function keys is executed within the DVD player application software according to a manipulation performed on any of the buttons included in the first and second function keys.

Assuming that the disk is not recognized to be loaded at step 908 and any button included in the second function key is recognized to be manipulated at step 1304, the portable computer is instructed to move a cursor according to the manipulated button or finalize a decision or execute a command in response to a press of the Enter key.

Figure 14:
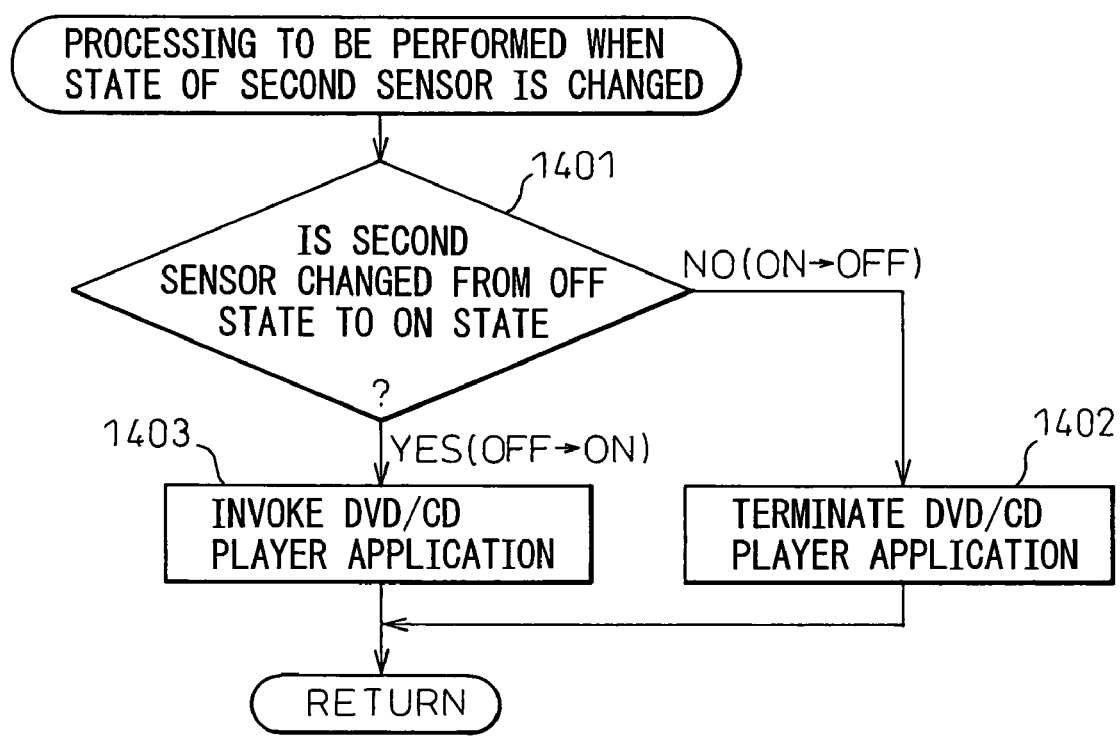
FIG. 14 is a flowchart describing an example of actions to be performed in the portable computer in accordance with the present invention (which has one operating system installed therein), which has the cover alone opened, when the state of the second sensor has changed.

Next, processing to be performed in case when the cover is left open, the second keyboard unit is opened or closed to disengage from or engage with the first keyboard unit will be described in conjunction with the flowchart of FIG. 14. The processing described in the flowchart is adapted to a case where one operating system is installed in the portable computer, and initiated with an interrupt signal described in conjunction with FIG. 7.

At step 1401, the second sensor is checked to see if it is activated, that is, it is changed from an off state to an on state. If the second sensor is recognized to be changed from the on state to the off state at step 1401, it means that the second keyboard unit is opened. At step 1402, the DVD or CD player application is terminated, and the portable computer is allowed to operate as the computer itself. The routine is terminated.

On the other hand, if the second sensor is recognized to be changed from the off state to the on state at step 1401, it means that the second keyboard unit is turned down. At step 1403, the DVD or CD player application is invoked and the routine is terminated.

Referring to the flowcharts of FIG. 9 to FIG. 14, the actions to be performed in the portable computer 1 in accordance with the present invention having the components shown in FIG. 1A to FIG. 4 have been described based on whether the cover 30 is open or closed or the second keyboard unit 20 is opened or closed to disengage from or engage with the first keyboard unit 10. The actions are a mere example. The actions to be performed in the portable computer 1 in accordance with the present invention are not limited to the embodiment. Needless to say, the portable computer 1 in accordance with the present invention is usable as a game machine.

What is claimed is:

1. A portable electronic apparatus comprising:
a first keyboard unit including a first keyboard;
a second keyboard unit including a second keyboard;
a first hinge being interposed between the first and second keyboard units and allowing the second keyboard unit to engage with the first keyboard unit with the first and second keyboard opposed to each other;
a display unit having a built-in display;
a second hinge allowing the display unit to engage with a back of the second keyboard unit with the second keyboard unit turned down to engage with the first keyboard unit; and
an operating unit arranged on the back of the second keyboard unit and capable of being manipulated with the second keyboard unit engaged with the first keyboard unit;
wherein the first hinge has a plurality of concave parts formed on a side opposite to the first and second keyboards when the first and second keyboards are not engaged.

2. The electronic apparatus according to claim 1, wherein the first hinge includes two shafts, that is, a first hinge shaft coupled to the first keyboard unit, and a second hinge shaft coupled to the second keyboard unit.

3. The electronic apparatus according to claim 2, wherein owing to the first hinge having the two shafts, the first and second keyboard units are engaged with each other when the second keyboard unit is turned down, and the first and second keyboards are flush with each other when the second keyboard unit is opened.

4. The electronic apparatus according to claim 3, wherein when the second keyboard unit is opened, the face of the first hinge is flush with the faces of the first and second keyboard units.

5. The electronic apparatus according to claim 4, wherein when the second keyboard unit is turned down to engage with the first keyboard unit, the back of the first hinge is flush with the flanks of the first and second keyboard units.

6. A portable electronic apparatus comprising:
a first keyboard unit that includes a first keyboard;
a second keyboard unit that is joined to the first keyboard unit via a first hinge so that the second keyboard unit can be engaged with the first keyboard unit
a display unit that is joined to the first keyboard unit via a second hinge and that has a built-in display;
a remote controller connection terminal; and
a first control unit that, when the power supply of the electronic apparatus is turned on and if the display unit is closed, instructs the electronic apparatus to reproduce data from a disk according to an operational instruction entered at a remote controller connected via the connection terminal; and
a memory unit storing a first operating system, a second operating system that provides the electronic apparatus with a larger number of features than the first operating system does and software that controls reproduction of data from a disk and that runs on the first operating system,
wherein when the power supply of the electronic apparatus is turned on, if the display unit is closed, the first control unit reads the first operating system and the software, which controls reproduction of data from a disk, from the memory unit.

7. A portable electronic apparatus comprising:
a first keyboard unit that includes a first keyboard;
a second keyboard unit that is joined to the first keyboard unit via a first hinge so that the second keyboard unit can be engaged with the first keyboard unit;
a display unit that is joined to the first keyboard unit via a second hinge and that has a built-in display;
a remote controller connection terminal; and
a first control unit that, when the power supply of the electronic apparatus is turned on and if the display unit is closed, instructs the electronic apparatus to reproduce data from a disk according to an operational instruction entered at a remote controller connected via the connection terminal; and
a memory unit storing a first operating system, a second operating system that provides the electronic apparatus with a larger number of features than the first operating system does and software that controls reproduction of data from a disk and that runs on the first operating system,
wherein, when the power supply of the electronic apparatus is turned on and if the display unit is open and the second keyboard unit is open, the first control unit reads the second operating system from the memory unit.

8. A portable electronic apparatus comprising:
a first keyboard including a bottom having a front end portion, a rear end portion opposing the front end portion and a first keyboard;
a first hinge;
a second keyboard unit joined to the first keyboard unit, via the first hinge so that the second keyboard can be turned down,
a second hinge; and
a display unit including, a built-in display, joined to the first keyboard unit at a side of the rear end portion of the first keyboard via the second hinge, the display unit being designed to engage with the second keyboard unit, which is turned down, when being turned down on the second hinge, wherein:
a flank of the display unit on the side of the second hinge is formed as an inclined surface that meets a side of the display unit, which is opposite to the side thereof on which the display is exposed, at a predetermined angle; and
when the display unit is opened with the rear portion side of the bottom of the first keyboard unit placed on a plane, the display unit is open to the greatest extent with the inclined surface abutted on the plane and meets the first keyboard at the predetermined angle.

9. The electronic apparatus according to claim 8, wherein the first keyboard and second keyboard constitute a keyboard having keys arranged in a predetermined manner.

10. The electronic apparatus according to claim 8, further comprising a drive circuit that, when the display unit is opened, drives the display included in the display unit.

11. A recording medium in which a program to be run in a portable electronic apparatus is recorded, wherein:
the electronic apparatus has a second keyboard unit joined to a first keyboard unit, which includes a first keyboard, via a first hinge so that the second keyboard unit can be turned down;
a display unit having a built-in display is joined to the first keyboard unit via a second hinge;

the display unit engages with the second keyboard unit, which is turned down, when the display unit is turned down on the second hinge;

the electronic apparatus has a built-in disk drive;

the program detects whether the display unit is open or closed when the power supply of the electronic apparatus is turned on, and instructs the electronic apparatus to control the operation of the disk drive according to whether the display unit is open or closed.

12. The recording medium according to claim 11, wherein:

the electronic apparatus has an operating unit formed on the side of the second keyboard unit that, when the display unit is turned down to engage with the second keyboard unit, is opposed to the display unit;

the program detects that the display unit is opened to disengage from the second keyboard unit, and instructs the electronic apparatus to control the operation of the disk drive according to an operational instruction entered at the operating unit.

13. The recording medium according to claim 11, wherein:

the electronic apparatus includes a remote controller connection terminal;

the program detects that the display unit is closed, and instructs the electronic apparatus to reproduce data from a disk according to an operational instruction entered at a remote controller connected via the connection terminal.

14. The recording medium according to claim 11, wherein:
the program detects that the display unit is opened to disengage from the second keyboard unit and the second keyboard is opened to disengage from the first keyboard, and instructs the electronic apparatus to control the operation of a computing feature according to an operational instruction entered using the first keyboard and second keyboard.

* * * * *

UNITED STATES PATENT AND TRADEMARK OFFICE
CERTIFICATE OF CORRECTION

| | |
|---|---|
| PATENT NO. | : 7,692,634 B2 |
| APPLICATION NO. | : 11/255919 |
| DATED | : April 6, 2010 |
| INVENTOR(S) | : Kenichi Kimura et al. |

It is certified that error appears in the above-identified patent and that said Letters Patent is hereby corrected as shown below:

Column 13, Line 50, after "keyboard unit" insert --;--.

Signed and Sealed this

Sixth Day of July, 2010

David J. Kappos
*Director of the United States Patent and Trademark Office*